US012124692B2

(12) United States Patent
Niu

(10) Patent No.: US 12,124,692 B2
(45) Date of Patent: Oct. 22, 2024

(54) FILE PROCESSING METHOD, ELECTRONIC DEVICE, SYSTEM, AND STORAGE MEDIUM

(71) Applicant: Huawei Technologies Co., Ltd., Shenzhen (CN)

(72) Inventor: Siyue Niu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/848,119

(22) Filed: Jun. 23, 2022

(65) Prior Publication Data

US 2022/0326825 A1 Oct. 13, 2022

Related U.S. Application Data

(63) Continuation of application No. PCT/CN2020/126958, filed on Nov. 6, 2020.

(30) Foreign Application Priority Data

Dec. 24, 2019 (CN) .......................... 201911344559.5

(51) Int. Cl.
G06F 3/0485 (2022.01)
G06F 3/0486 (2013.01)
(Continued)

(52) U.S. Cl.
CPC ............ G06F 3/0485 (2013.01); G06F 9/542 (2013.01); H04W 76/10 (2018.02); G06F 3/0486 (2013.01);
(Continued)

(58) Field of Classification Search
CPC .... G06F 3/1454; G06F 3/0485; G06F 3/0486; G06F 9/542; G06F 2203/04803;
(Continued)

(56) References Cited

U.S. PATENT DOCUMENTS 9,317,195 B1* 4/2016 Grechishkin ....... G06F 3/04842
2005/0268250 A1* 12/2005 Skistimas ........... G06F 9/45512
715/810

(Continued)

FOREIGN PATENT DOCUMENTS

CN 105791964 A 7/2016
CN 107590006 A 1/2018
(Continued)

Primary Examiner — Daniel Samwel
(74) Attorney, Agent, or Firm — Leydig, Voit & Mayer, Ltd.

(57) ABSTRACT

A file processing method, an electronic device, a system, and a storage medium are provided. The method includes: A second electronic device projects onto a first electronic device, and generates a collaboration window on the first electronic device; it is detected that a target file in the first electronic device is dragged by a first operation to an icon of a first application in the collaboration window, and the first operation is released, and the first application is used to open the target file in the collaboration window; and it is detected that the target file in the first electronic device is dragged by a second operation to an icon of a second application in the collaboration window, and the second operation is released, and the second application is used to open the target file in the collaboration window.

19 Claims, 14 Drawing Sheets

(51) Int. Cl.
*G06F 3/14* (2006.01)
*G06F 9/54* (2006.01)
*H04W 76/10* (2018.01)

(52) U.S. Cl.
CPC .. *G06F 3/1454* (2013.01); *G06F 2203/04803* (2013.01)

(58) Field of Classification Search
CPC ......... H04M 1/72409; H04M 1/72412; H04M 1/72415; H04W 76/10
See application file for complete search history.

(56) References Cited

U.S. PATENT DOCUMENTS

| | | | | |
|---|---|---|---|---|
| 2006/0059174 | A1* | 3/2006 | Mese | G06F 9/445 |
| 2006/0136828 | A1* | 6/2006 | Asano | G06F 3/1454 |
| | | | | 715/764 |
| 2011/0296337 | A1* | 12/2011 | Louch | G06F 3/0486 |
| | | | | 715/779 |
| 2012/0173995 | A1* | 7/2012 | Alameh | G06F 3/0486 |
| | | | | 715/761 |
| 2013/0010000 | A1 | 1/2013 | Chiu et al. | |
| 2013/0205251 | A1* | 8/2013 | Cisler | G06F 16/168 |
| | | | | 715/810 |
| 2014/0317559 | A1 | 10/2014 | Wakefield | |
| 2014/0344247 | A1* | 11/2014 | Procopio | G06F 16/248 |
| | | | | 707/722 |
| 2016/0216861 | A1 | 7/2016 | Hou et al. | |
| 2016/0357427 | A1* | 12/2016 | Chang | G08C 17/02 |
| 2017/0017454 | A1* | 1/2017 | Kim | G06F 3/04845 |
| 2018/0275948 | A1* | 9/2018 | Xu | G06F 3/1454 |
| 2018/0357230 | A1* | 12/2018 | Xiong | G06F 16/94 |
| 2020/0333994 | A1* | 10/2020 | Sepulveda | G06F 3/0486 |
| 2021/0042002 | A1* | 2/2021 | Lee | G06F 15/173 |
| 2021/0084136 | A1* | 3/2021 | Zhao | H04L 67/06 |
| 2021/0374106 | A1* | 12/2021 | Liu | G06F 16/176 |

FOREIGN PATENT DOCUMENTS

| | | |
|---|---|---|
| CN | 109343755 A | 2/2019 |
| CN | 109451141 A | 3/2019 |
| CN | 109462692 A | 3/2019 |
| CN | 109782976 A | 5/2019 |
| CN | 110471639 A | 11/2019 |
| CN | 110515580 A | 11/2019 |
| CN | 110519461 A | 11/2019 |
| CN | 110602805 A | 12/2019 |
| CN | 111158543 A | 5/2020 |
| CN | 112162716 A | 1/2021 |
| JP | 2012079027 A | 4/2012 |
| JP | 2015125614 A | 7/2015 |
| WO | 2013178152 A1 | 12/2013 |
| WO | 2018196621 A1 | 11/2018 |

\* cited by examiner

FILE PROCESSING METHOD, ELECTRONIC DEVICE, SYSTEM, AND STORAGE MEDIUM

CROSS-REFERENCE TO RELATED APPLICATIONS

This application is a continuation of International Application No. PCT/CN2020/126958, filed on Nov. 6, 2020, which claims priority to Chinese Patent 201911344559.5, filed on Dec. 24, 2019. The disclosures of the aforementioned applications are hereby incorporated by reference in their entireties.

TECHNICAL FIELD

This application relates to the field of computer technologies, and in particular, to a file processing method, an electronic device, a system, and a storage medium.

BACKGROUND

In a Windows or macOS system, a user may drag a target file to an area corresponding to an icon of a target application. If the target application supports a type of the dragged file, the target application automatically opens the target file after the dragging operation ends. The user can quickly view and edit the dragged target file without first opening the target application. This conforms to interaction intuition. However, the preceding operation may be performed only when the target file and target application are on the same system, and may not be performed across systems.

SUMMARY

In view of this, embodiments of this application provide a file processing method, an electronic device, a system, and a storage medium, so that after a target file is dragged across systems to an icon of a target application in a collaboration window, the target application automatically opens the target file.

According to a first aspect, an embodiment of this application provides a file processing method, applied to a first electronic device. The first electronic device and a second electronic device establish a wireless connection. The method includes:

displaying, on a screen of a display of the first electronic device, a collaboration window generated when the second electronic device projects onto the first electronic device, where the collaboration window includes a desktop of the second electronic device, the desktop of the second electronic device includes at least an icon of a first application and an icon of a second application, and the first application is different from the second application;

detecting that a target file in the first electronic device is dragged by a first operation to the icon of the first application in the collaboration window, and the first operation is released, and using the first application to open the target file in the collaboration window; and detecting that the target file in the first electronic device is dragged by a second operation to the icon of the second application in the collaboration window, and the second operation is released, and using the second application to open the target file in the collaboration window.

In a possible implementation, that the first electronic device and a second electronic device establish a wireless connection specifically includes:

establishing, by the first electronic device, the wireless connection to the second electronic device by using a Huawei Share OneHop technology.

In a possible implementation, content of the collaboration window correspondingly changes with an operation performed by a user on the second electronic device.

In a possible implementation, before the using the first application to open the target file in the collaboration window, the method further includes:

determining whether the first application supports opening of the target file; and if it is determined that the first application does not support opening of the target file, prompting the user that the first application does not support opening of the target file, recommending, to the user, a target application based on a type of the target file, and asking, based on the target application, the user whether to use the target application to open the target file; or if it is determined that the first application supports opening of the target file, continuously using the first application to open the target file in the collaboration window.

In a possible implementation, before the using the second application to open the target file in the collaboration window, the method further includes:

determining whether the second application supports opening of the target file; and if it is determined that the second application does not support opening of the target file, prompting the user that the second application does not support opening of the target file, recommending, to the user, a target application based on the type of the target file, and asking, based on the target application, the user whether to use the target application to open the target file; or if it is determined that the second application supports opening of the target file, continuously using the second application to open the target file in the collaboration window.

In a possible implementation, the first application includes a picture editing application.

In a possible implementation, the second application includes a picture editing application.

In a possible implementation, the first application includes a social application.

The using the first application to open the target file in the collaboration window includes:

using the first application to open the target file in the collaboration window, and prompting the user whether to present a status based on the opened target file.

In a possible implementation, the second application includes a social application.

The using the second application to open the target file in the collaboration window includes:

using the second application to open the target file in the collaboration window, and prompting the user whether to present a status based on the opened target file.

According to another aspect, an embodiment of this application provides a first electronic device. The first electronic device and a second electronic device establish a wireless connection. The first electronic device includes a display, a processor, and a memory. The memory is configured to store a computer program. The computer program includes program instructions. When the program instructions are executed by the first electronic device, the first electronic device is enabled to perform the following steps:

displaying, on a screen of a display of the first electronic device, a collaboration window generated when the second electronic device projects onto the first electronic device, where the collaboration window includes a desktop of the second electronic device, the desktop of the second electronic device includes at least an icon of a first application and an icon of a second application, and the first application is different from the second application;

if it is detected that a target file in the first electronic device is dragged by a first operation to the icon of the first application in the collaboration window, and the first operation is released, using the first application to open the target file in the collaboration window; and if it is detected that the target file in the first electronic device is dragged by a second operation to the icon of the second application in the collaboration window, and the second operation is released, using the second application to open the target file in the collaboration window.

In a possible implementation, content of the collaboration window correspondingly changes with an operation performed by a user on the second electronic device.

In a possible implementation, when the instructions are executed by the first electronic device, the first electronic device is enabled to perform the following steps:

before the using the first application to open the target file in the collaboration window, determining whether the first application supports opening of the target file; and if it is determined that the first application does not support opening of the target file, prompting the user that the first application does not support opening of the target file, recommending, to the user, a target application based on a type of the target file, and asking, based on the target application, the user whether to use the target application to open the target file; or if it is determined that the first application supports opening of the target file, continuously using the first application to open the target file in the collaboration window.

In a possible implementation, when the instructions are executed by the first electronic device, the first electronic device is enabled to perform the following steps:

before the using the second application to open the target file in the collaboration window, determining whether the second application supports opening of the target file; and if it is determined that the second application does not support opening of the target file, prompting the user that the second application does not support opening of the target file, recommending, to the user, a target application based on the type of the target file, and asking, based on the target application, the user whether to use the target application to open the target file; or if it is determined that the second application supports opening of the target file, continuously using the second application to open the target file in the collaboration window.

In a possible implementation, the first application includes a picture editing application.

In a possible implementation, the second application includes a picture editing application.

In a possible implementation, the first application includes a social application.

When the instructions are executed by the first electronic device, the first electronic device is enabled to perform the following step:

using the first application to open the target file in the collaboration window, and prompting the user whether to present a status based on the opened target file.

In a possible implementation, the second application includes a social application.

When the instructions are executed by the first electronic device, the first electronic device is enabled to perform the following steps:

using the second application to open the target file in the collaboration window, and prompting the user whether to present a status based on the opened target file.

According to another aspect, an embodiment of this application provides a file processing system, including the first electronic device and a second electronic device. The first electronic device and the second electronic device establish a wireless connection.

According to another aspect, an embodiment of this application provides a computer-readable storage medium. The computer-readable storage medium stores a computer program. The computer program includes program instructions. When the program requests are run by a computer, the computer is enabled to perform the method.

In technical solutions of the file processing method, the electronic device, the system, and the storage medium provided in embodiments of this application, the second electronic device projects onto the first electronic device, and generates the collaboration window on the first electronic device, where the collaboration window includes the desktop of the second electronic device. It is detected that the target file in the first electronic device is dragged by the first operation to the icon of the first application in the collaboration window, and the first operation is released; and the first application is used to open the target file in the collaboration window. It is detected that the target file in the first electronic device is dragged by the second operation to the icon of the second application in the collaboration window, and the second operation is released; and the second application is used to open the target file in the collaboration window. This can implement that after the target file is dragged to an icon of one target application in the collaboration window across systems, the target application automatically opens the target file.

DESCRIPTION OF EMBODIMENTS

To better understand the technical solutions of this application, the following describes embodiments of this application in detail with reference to the accompanying drawings.

It should be clear that the described embodiments are merely a part rather than all of embodiments of this application. All other embodiments obtained by a person of ordinary skill in the art based on embodiments of this application without creative efforts shall fall within the protection scope of this application.

Terms used in embodiments of this application are merely for the purpose of describing specific embodiments, but are not intended to limit this application. Terms "a", "the", and "this" of singular forms used in embodiments and the appended claims of this application are also intended to include plural forms, unless otherwise specified in the context clearly.

It should be understood that the term "and/or" used in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

File processing in this application is a process of processing, when one electronic device projects onto another electronic device, on the another electronic device, a file of the another electronic device by using an application of the electronic device. Projection in this application may include wired projection and wireless projection. For the wired projection, a connection between a plurality of electronic devices may be established by using data cables, and data is transmitted through the data cables. For the wireless projection, a connection between a plurality of electronic devices may be established over a wireless projection protocol, and data is transmitted through a WLAN.

Operation processing across systems refers to performing operation processing on a file between an operating system of a first electronic device 100 and an operating system of a second electronic device 200. The operating system of the first electronic device 100 and the operating system of the second electronic device 200 may be systems of a same type or different types.

Figure 1:
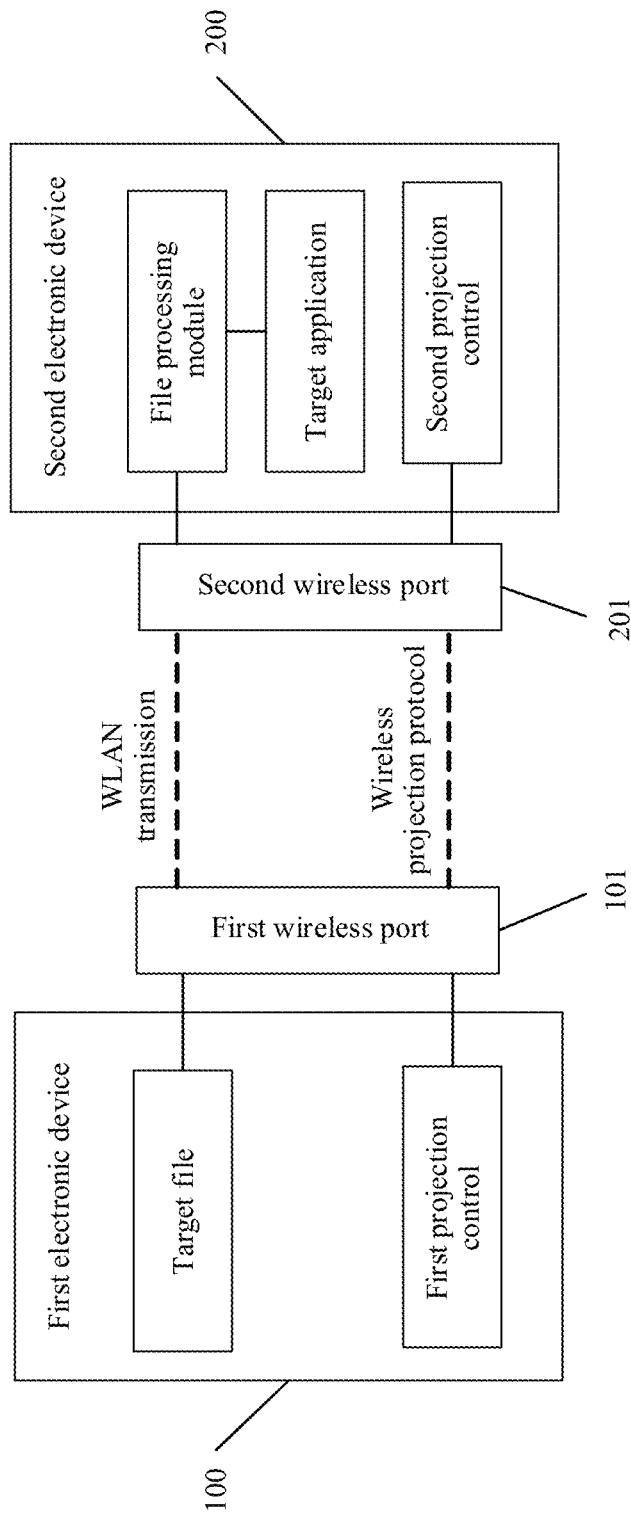
FIG. 1 is a diagram of an architecture of a file processing system according to an embodiment of this application.

FIG. 1 is a diagram of an architecture of a file processing system according to an embodiment of this application. The file processing system in this application includes at least two electronic devices and two transmission ports. One electronic device is connected to one transmission port, and the transmission port includes a wired port (not shown in the figure) and/or a wireless port. As shown in FIG. 1, the file processing system includes the first electronic device 100, the second electronic device 200, a first wireless port 101, and a second wireless port 201. The first wireless port 101 may be integrated into the first electronic device 100, or may be disposed independently of the first electronic device 100. The second wireless port 201 may be integrated into the second electronic device 200, or may be disposed independently of the second electronic device 200. This is not limited in this embodiment of this application. The first electronic device 100 and the second electronic device 200 may establish a projection connection and WLAN transmission by using a wireless port. The first electronic device 100 stores a target file. The first electronic device 100 has a projection receiving (Sink) capability, an image display capability, and a data sending capability. Optionally, the first electronic device 100 may include a first projection control, and the first projection control is configured to implement the projection receiving (Sink) capability. The second electronic device 200 may run a target application. The second electronic device 200 has a projection sending (Source) capability. Optionally, the second electronic device 200 may include a second projection control, and the second projection control is configured to implement the projection sending (Source) capability.

Examples of the first electronic device 100 and the second electronic device 200 include but are not limited to an electronic device equipped with an iOS, an Android, a Microsoft, or another operating system. Optionally, the first electronic device 100 includes a mobile phone, a tablet computer, a wearable device, or a personal computer. The second electronic device 200 includes a mobile phone, a tablet computer, a wearable device, or a personal computer.

Manners of establishing a wireless projection connection and wireless transmission between the first electronic device 100 and the second electronic device 200 are not limited in this embodiment of this application. The first electronic device 100 and the second electronic device 200 may establish a wireless connection by using a Huawei Share OneHop technology. For example, by using the Huawei Share "OneHop" technology, automatic pairing can be implemented after NFC sensor areas of the first electronic device 100 and the second electronic device 200 are in contact. After the pairing, the wireless projection connection and the WLAN transmission are automatically established between the first electronic device 100 and the second electronic device 200.

Figure 4:
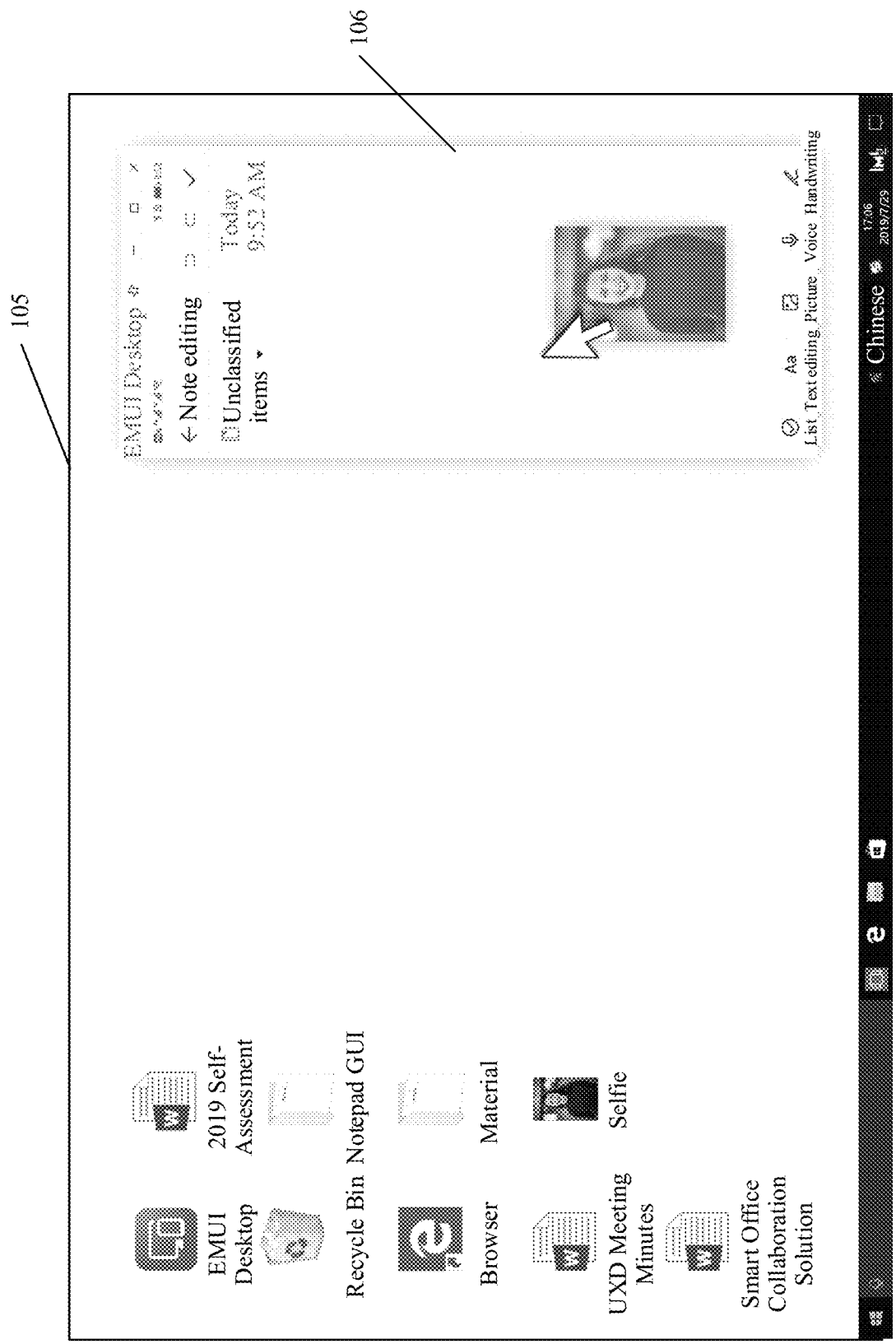
FIG. 4 is a schematic diagram of dragging a target file to an interface of a first application.

After the first electronic device 100 and the second electronic device 200 establish the projection connection, the second electronic device 200 sends projection data to the first electronic device 100. The projection data includes a real-time video stream. The first electronic device 100 generates a collaboration window on a screen of a display of the first electronic device 100 based on the projection data sent by the second electronic device 200. The collaboration window is a projection interface of the second electronic device 200 on the first electronic device 100. In this case, the operating system of the first electronic device 100 and the operating system of the second electronic device 200 are in a collaboration mode. FIG. 4 to FIG. 11 are all display interfaces of the first electronic device in the collaboration mode, and a user may control both the operating system of the first electronic device 100 and the operating system of the second electronic device 200 by using a cursor of the first electronic device 100. As shown in FIG. 4, the screen 105 of the first electronic device 100 includes the collaboration window 106. When moving the cursor into the collaboration window 106, the user may control the operating system of the second electronic device 200.

In a related technology, in the collaboration mode, a technical solution of using the target application on the second electronic device 200 to open the target file in the first electronic device 100 is usually that the user first starts the target application on the second electronic device 200, then drags the target file to a window that is opened by the target application and is in the collaboration window 106. After the dragging operation ends, the target application automatically opens the target file. Before dragging the target file to the collaboration window 106, the user further needs to first start the target application in the collaboration window 106. Therefore, a method for opening a target file across systems in the related technology is complex, and consequently the first electronic device 100 may not quickly use the target application of the second electronic device 200 to process the target file in the first electronic device 100. This reduces processing efficiency of the first electronic device 100.

Figure 2:
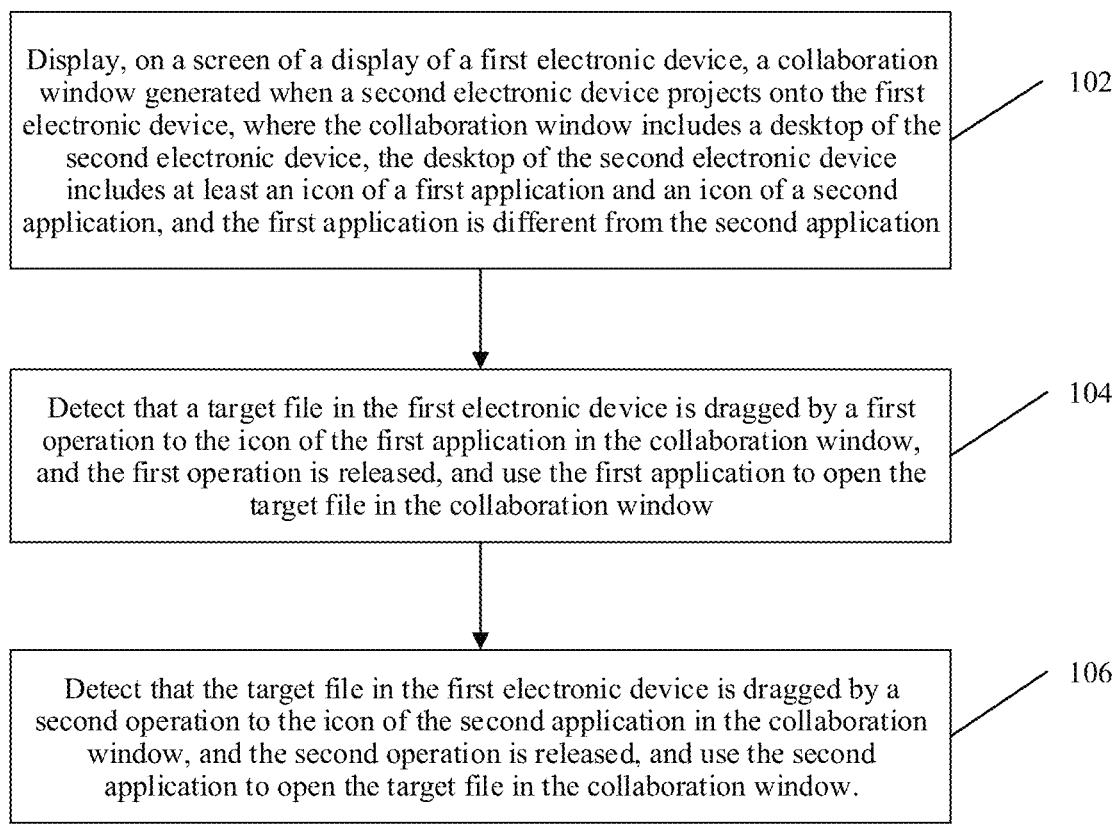
FIG. 2 is a flowchart of a file processing method according to an embodiment of this application.

Based on the diagram of an architecture shown in FIG. 1 and the technical problem existing in a related technology, an embodiment of this application provides a file processing method. FIG. 2 is a flowchart of a file processing method according to an embodiment of this application. The file processing method is applied to the first electronic device 100. The first electronic device 100 and the second electronic device 200 establish a wireless connection. As shown in FIG. 2, the method includes the following steps.

Step 102: Display, on a screen of a display of the first electronic device, a collaboration window generated when the second electronic device projects onto the first electronic device, where the collaboration window includes a desktop of the second electronic device, the desktop of the second electronic device includes at least an icon of a first application and an icon of a second application, and the first application is different from the second application.

Step 104: Detect that the target file in the first electronic device is dragged by a first operation to the icon of the first application in the collaboration window, and the first operation is released, and use the first application to open the target file in the collaboration window.

Step 106: Detect that the target file in the first electronic device is dragged by a second operation to the icon of the second application in the collaboration window, and the second operation is released, use the second application to open the target file in the collaboration window.

In this embodiment, the steps 104 and 106 are not subject to a specific sequence. The step 104 may be performed before the step 106, or the step 106 may be performed before the step 104.

In a technical solution of the file processing method provided in this embodiment, the second electronic device projects onto the first electronic device, and generates the collaboration window on the first electronic device. The collaboration window includes the desktop of the second electronic device. It is detected that the target file in the first electronic device is dragged by the first operation to the icon of the first application in the collaboration window, and the first operation is released; and the first application is used to open the target file in the collaboration window. It is detected that the target file in the first electronic device is dragged by the second operation to the icon of the second application in the collaboration window, and the second operation is released; and the second application is used to open the target file in the collaboration window. This can implement that after the target file is dragged to an icon of one target application in the collaboration window across systems, the target application automatically opens the target file.

Figure 3A:
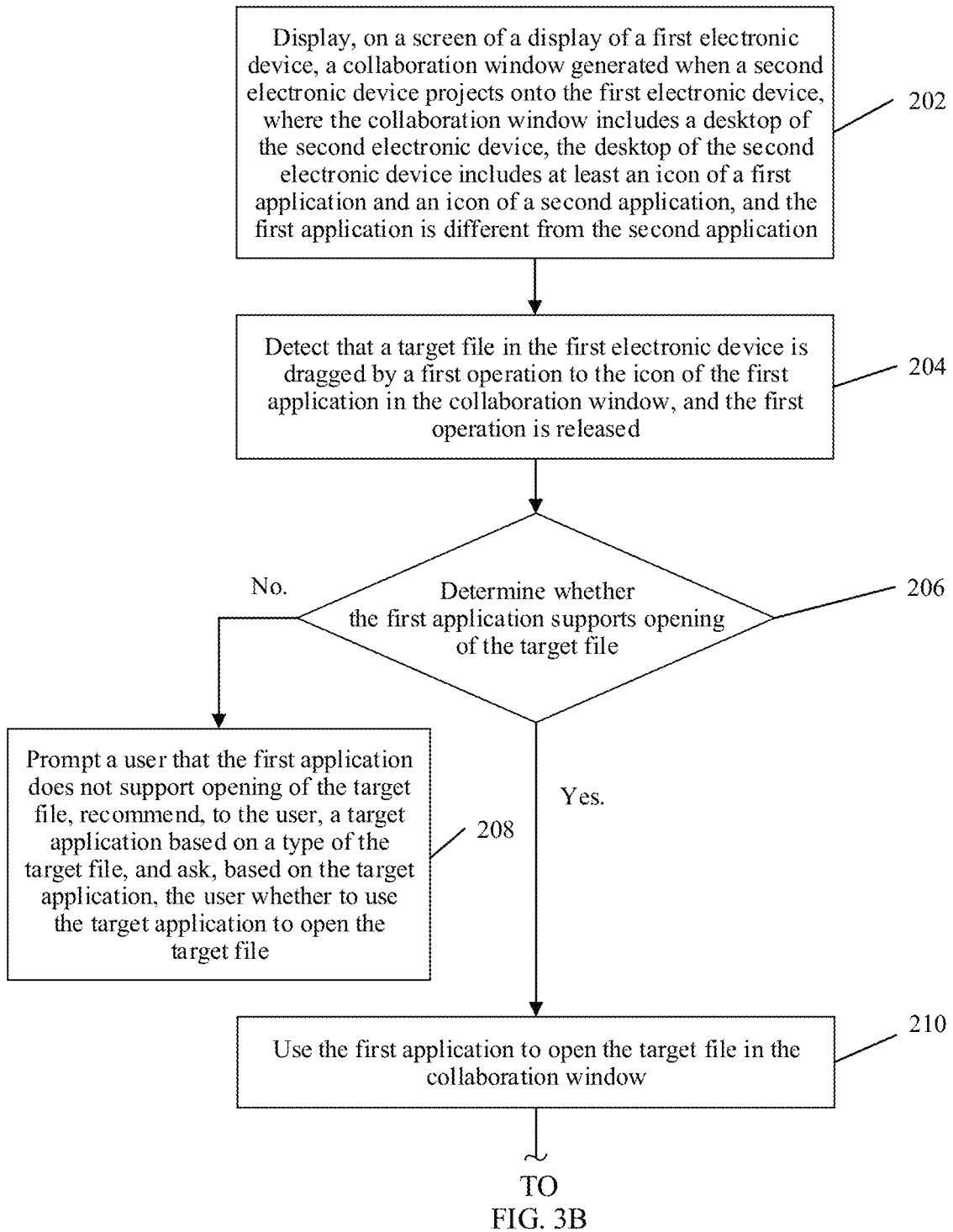
FIG. 3A and FIG. 3B are a flowchart of a file processing method according to still another embodiment of this application.
Figure 3B:
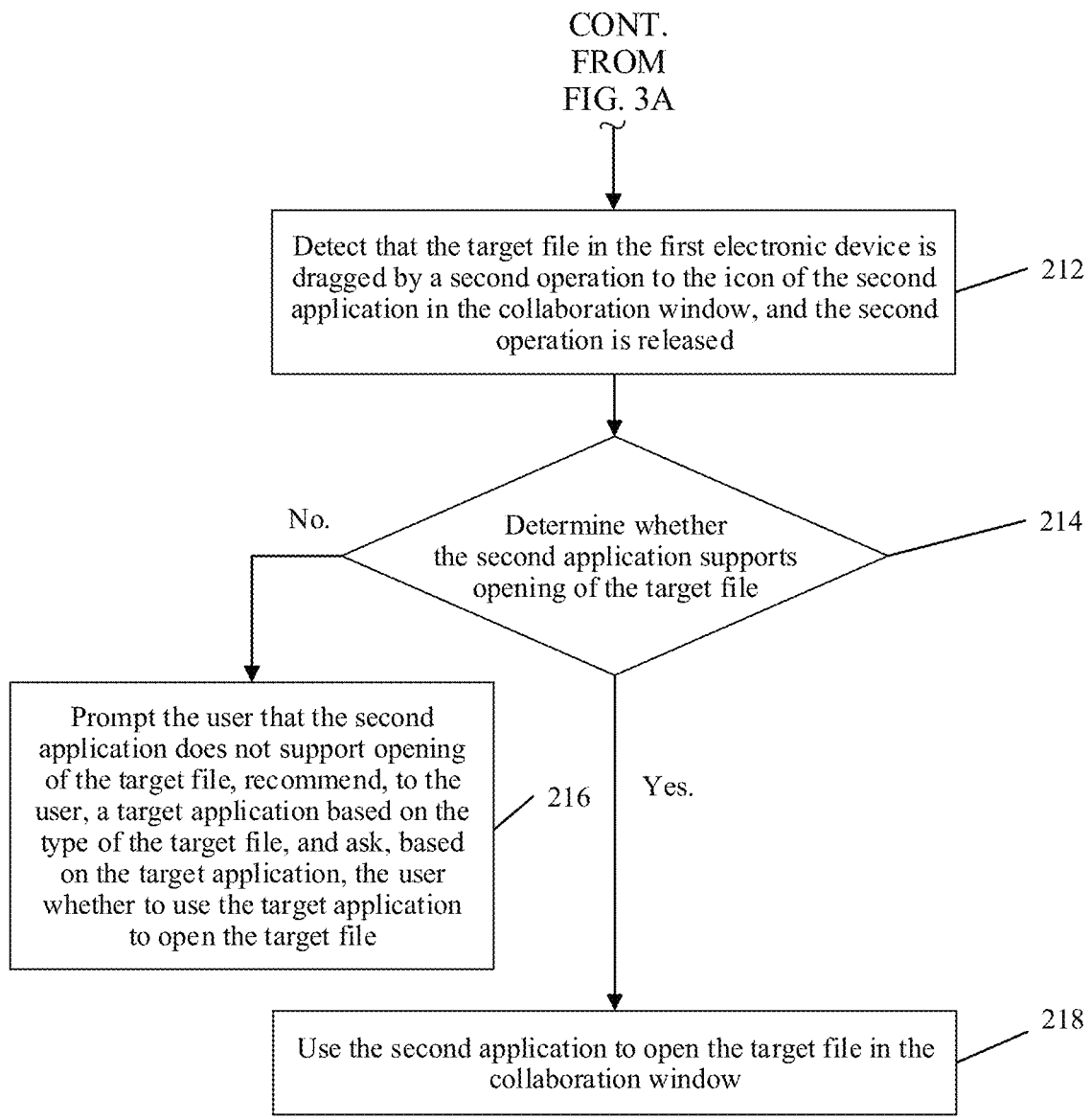

FIG. 3A and FIG. 3B are a flowchart of a file processing method according to another embodiment of this application. The file processing method is applied to the first electronic device 100. The first electronic device 100 and the second electronic device 200 establish a wireless connection. As shown in FIG. 3A and FIG. 3B, the method includes the following steps.

Step 202: Display, on a screen of a display of the first electronic device, a collaboration window generated when the second electronic device projects onto the first electronic device, where the collaboration window includes a desktop of the second electronic device, the desktop of the second electronic device includes at least an icon of a first application and an icon of a second application, and the first application is different from the second application.

In this embodiment, that the first electronic device 100 and the second electronic device 200 establish a wireless connection specifically includes: The first electronic device 100 and the second electronic device 200 establish the wireless connection by using a Huawei Share OneHop technology.

The desktop of the second electronic device 200 includes each page of the second electronic device 200.

Content of the collaboration window correspondingly changes with an operation performed by a user on the second electronic device 200.

In this embodiment, the desktop of the second electronic device includes at least an icon of a first application and an icon of a second application. The first application is different from the second application. Specifically, one target file may at least be dragged to ions of two different applications, and corresponding operations may be different when the target file is dragged to different icons.

Step 204: Detect that a target file in the first electronic device is dragged by a first operation to the icon of the first application in the collaboration window, and the first operation is released.

In this embodiment, the target file is stored in the first electronic device 100, and the first operation includes an operation of using a cursor to drag the target file by the user. The target file may include various types of files. For example, the target file may include a text type, a picture type, a link type, a voice type, or a video type of file.

Step 206: Determine whether the first application supports opening of the target file, and if the first application does not support opening of the target file, perform step 208, or if the first application supports opening of the target file, perform step 210.

In this embodiment, before the first application is used to open the target file, whether the first application supports opening of the target file needs to be determined, that is, whether an extension name of a file supported by the first application includes an extension name of the target file is determined. If the extension name of the file supported by the first application does not include the extension name of the target file, it indicates that the target file cannot be opened by the first application; or if the extension name of the file supported by the first application includes the extension name of the target file, it indicates that the target file can be opened by the first application.

Step 208: Prompt the user that the first application does not support opening of the target file, recommend, to the user, a target application based on a type of the target file, and ask, based on the target application, the user whether to use the target application to open the target file.

Step 210: Use the first application to open the target file in the collaboration window.

In the related technology, in a collaboration mode, if the first application is used to open the target file in the collaboration window, the first application needs to be opened first.

Figure 5:
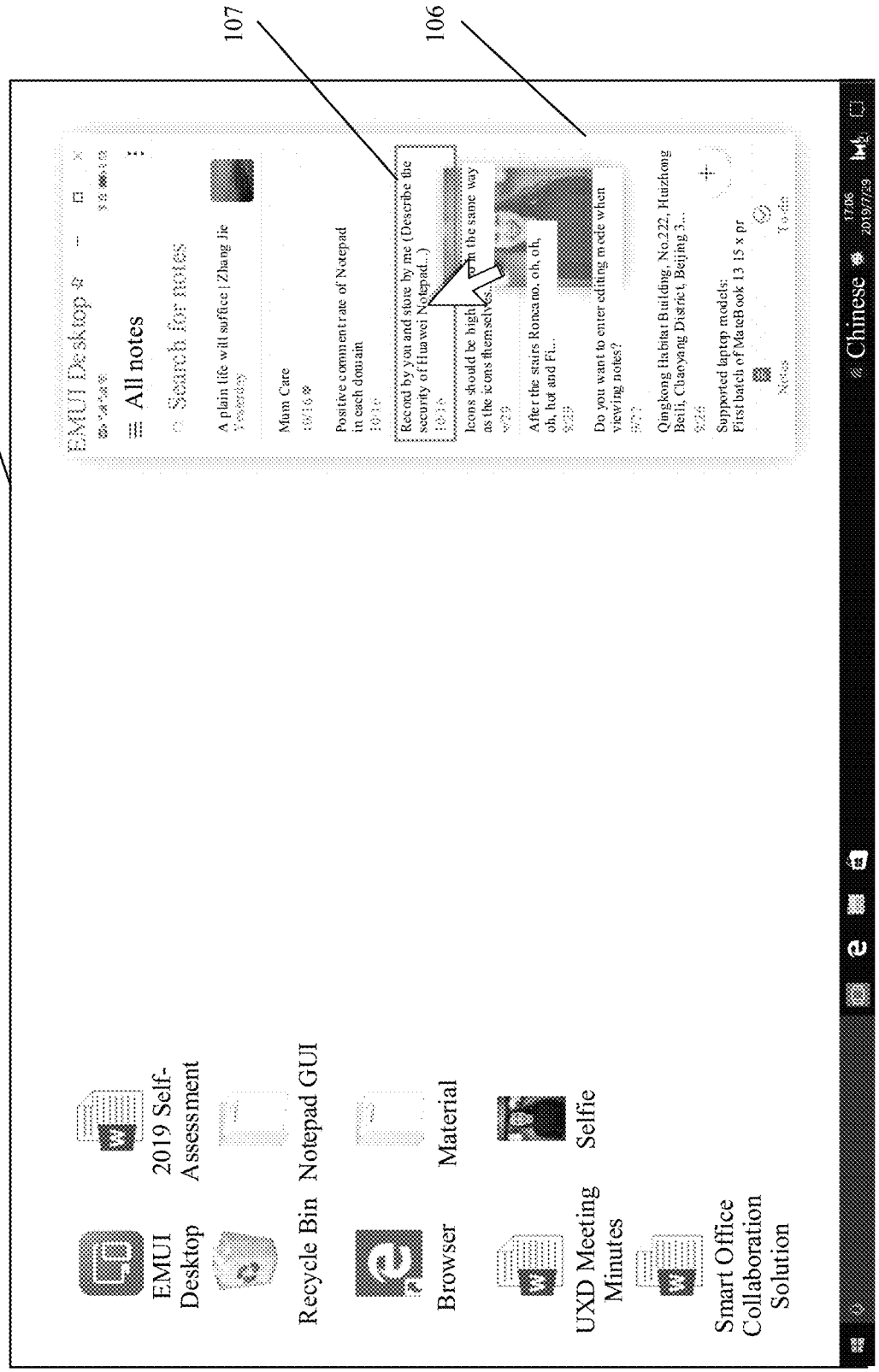
FIG. 5 is another schematic diagram of dragging a target file to an interface of a first application.
Figure 6:
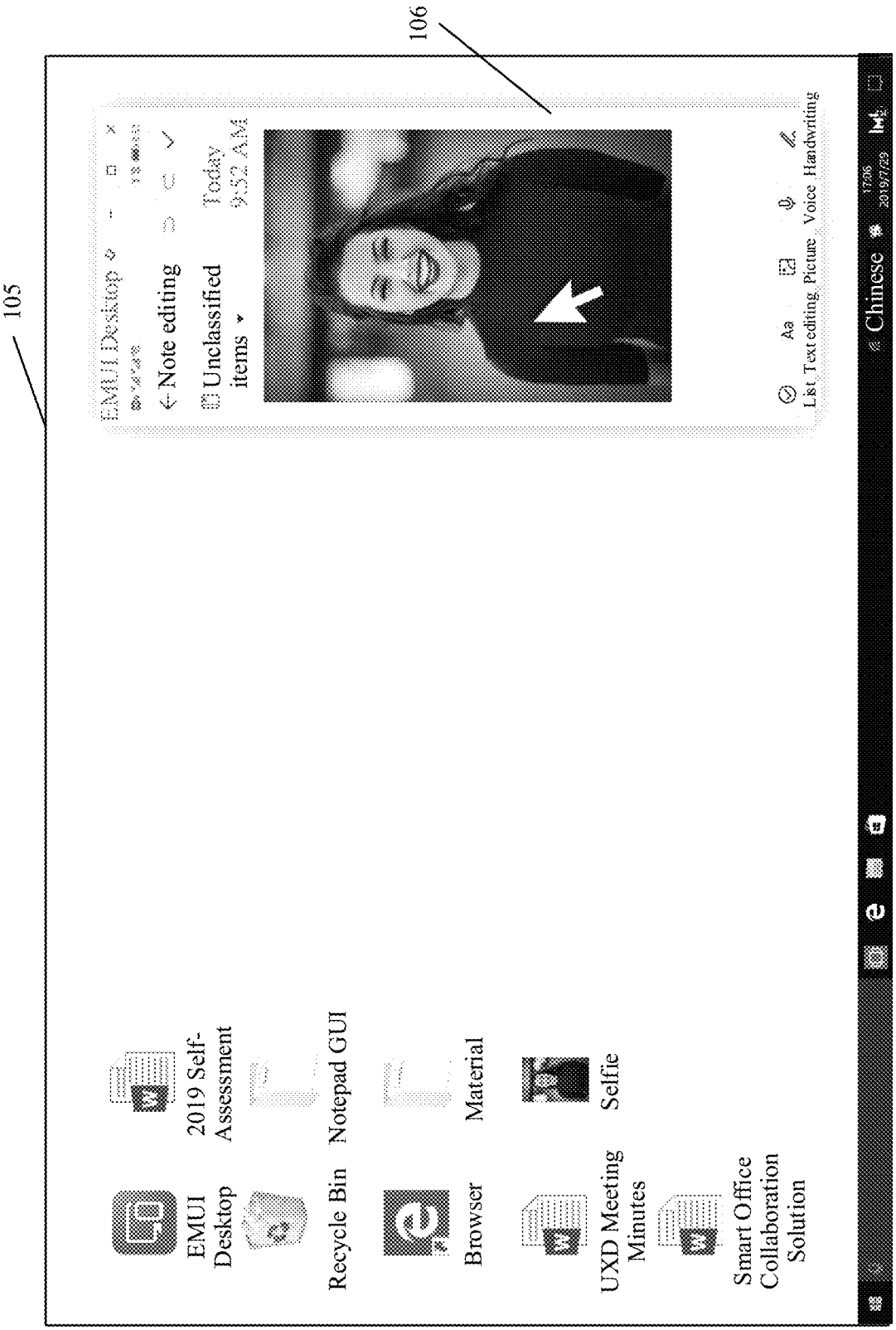
FIG. 6 is a schematic diagram of opening a target file by a first application.

For example, the first application includes "notepad". FIG. 4 is a schematic diagram of dragging a target file to an interface of a first application. FIG. 5 is another schematic diagram of dragging a target file to an interface of a first application. FIG. 6 is a schematic diagram of opening a target file by a first application. As shown in FIG. 4, the target file is a file in a picture format named "selfie", and the first application is "notepad". When it is detected that the "selfie" file is dragged by the first operation to a notepad editing interface of "notepad", and the first operation is released, because "notepad" supports the file in a picture format, the "selfie" file may be opened by "notepad", as shown in FIG. 6. As shown in FIG. 5, when it is detected that the "selfie" file is dragged to an area 107, corresponding to a note in a notepad list interface of "notepad", and the first operation is released, because "notepad" supports the file in a picture format, the "selfie" file may also be opened by "notepad", as shown in FIG. 6.

Figure 7:
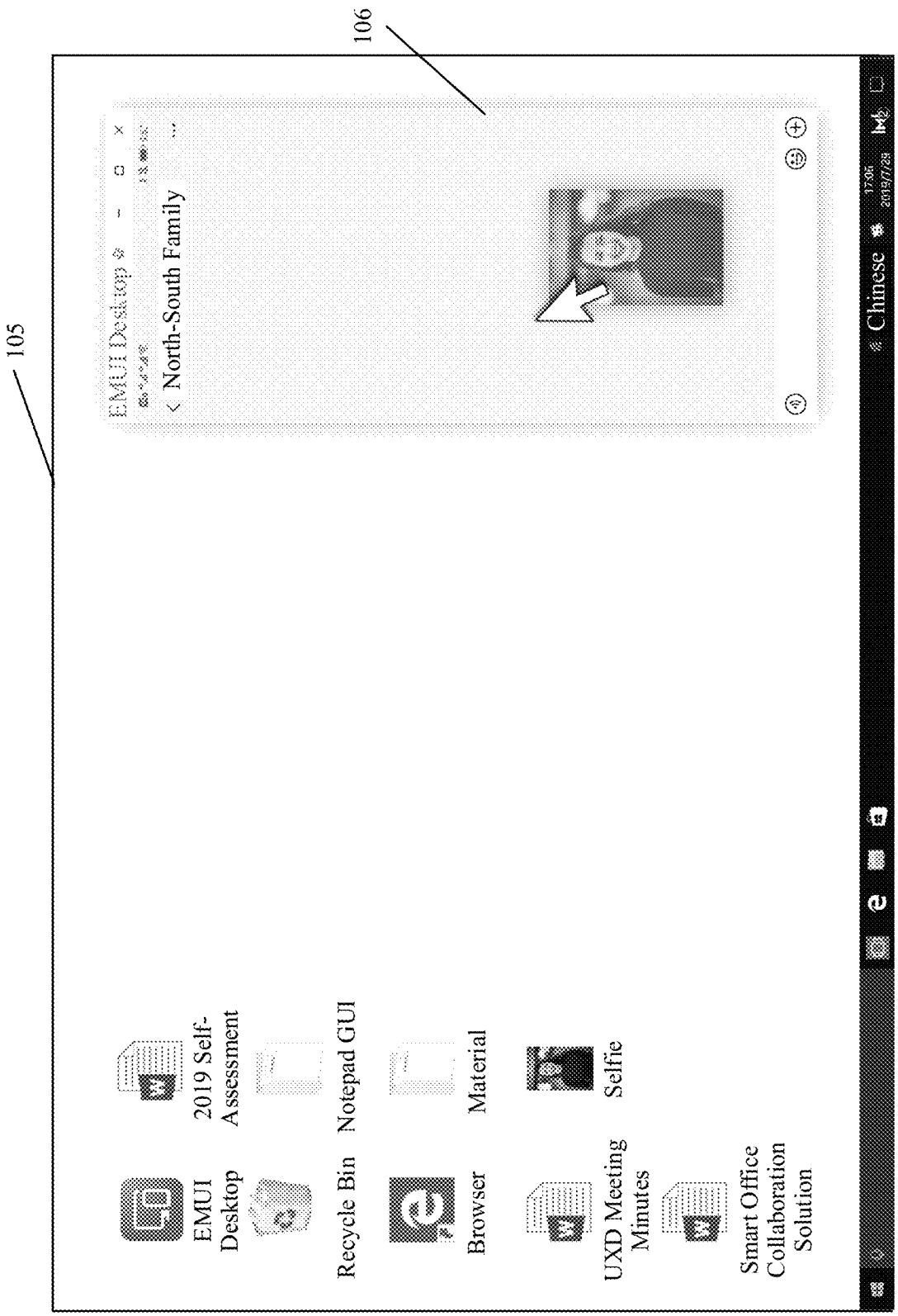
FIG. 7 is a schematic diagram of dragging a target file to an interface of a first application.
Figure 8:
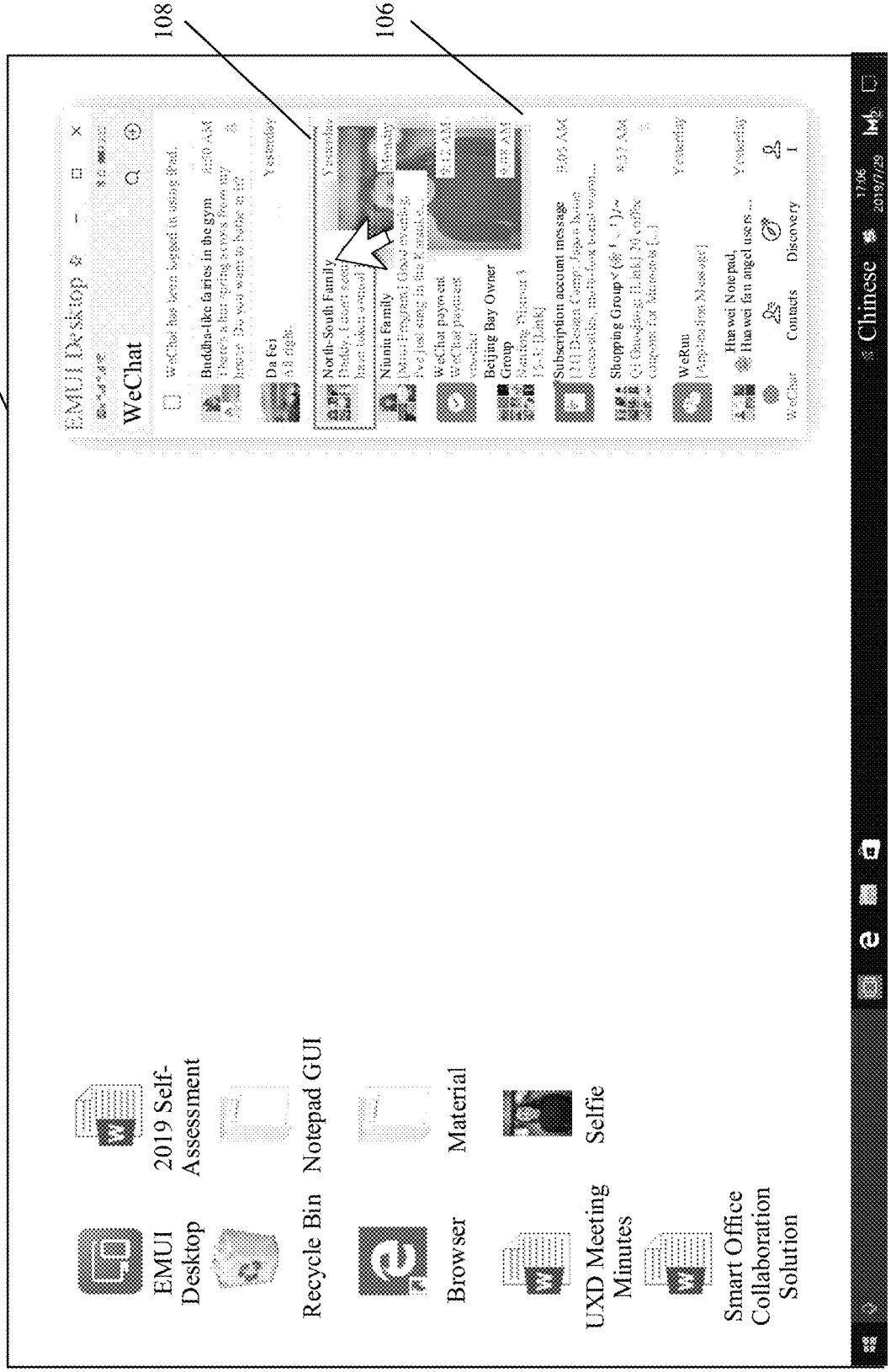
FIG. 8 is another schematic diagram of dragging a target file to an interface of a first application.
Figure 9:
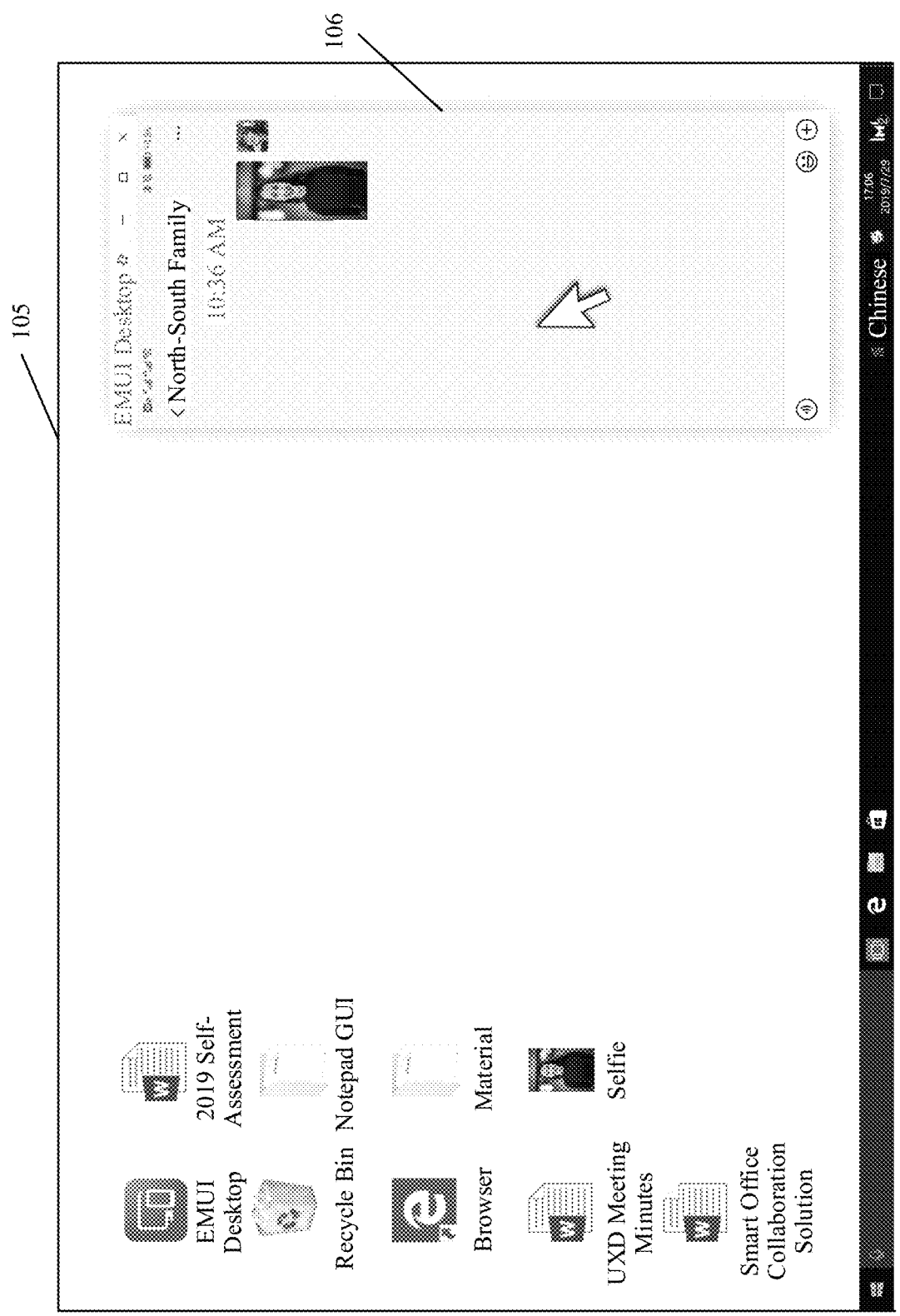
FIG. 9 is a schematic diagram of opening a target file by a first application.

For example, the first application includes "WeChat". FIG. 7 is a schematic diagram of dragging a target file to an interface of a first application. FIG. 8 is another schematic diagram of dragging a target file to an interface of a first application. FIG. 9 is a schematic diagram of opening a target file by a first application. As shown in FIG. 7, the target file is a file in a picture format named "selfie", and the first application is "WeChat". When it is detected that the "selfie" file is dragged by the first operation to a session interface of a contact "North-South Family" in "WeChat", and the first operation is released, because "WeChat" supports the file in a picture format, the "selfie" file is opened by "WeChat" and is automatically sent to the contact "North-South Family", as shown in FIG. 9. As shown in FIG. 8, when it is detected that the "selfie" file is dragged to an area 108 corresponding to the contact "North-South Family" in a "WeChat" contact list interface, and the first operation is released, because "WeChat" supports the file in a picture format, the "selfie" file may also be opened by "WeChat" and automatically sent to the contact "North-South Family", as shown in FIG. 9.

In this embodiment, in the collaboration mode, the first application does not need to be started first, and the first application may be used to open the target file in the collaboration window provided that the target file is dragged to the icon of the first application. Compared with the related technology, a technical solution provided in this embodiment can implement that the first electronic device 100 quickly uses the target application of the second electronic device 200 to process the target file in the first electronic device 100. This improves processing efficiency of the first electronic device 100.

Optionally, the first application includes a picture editing application.

Figure 10:
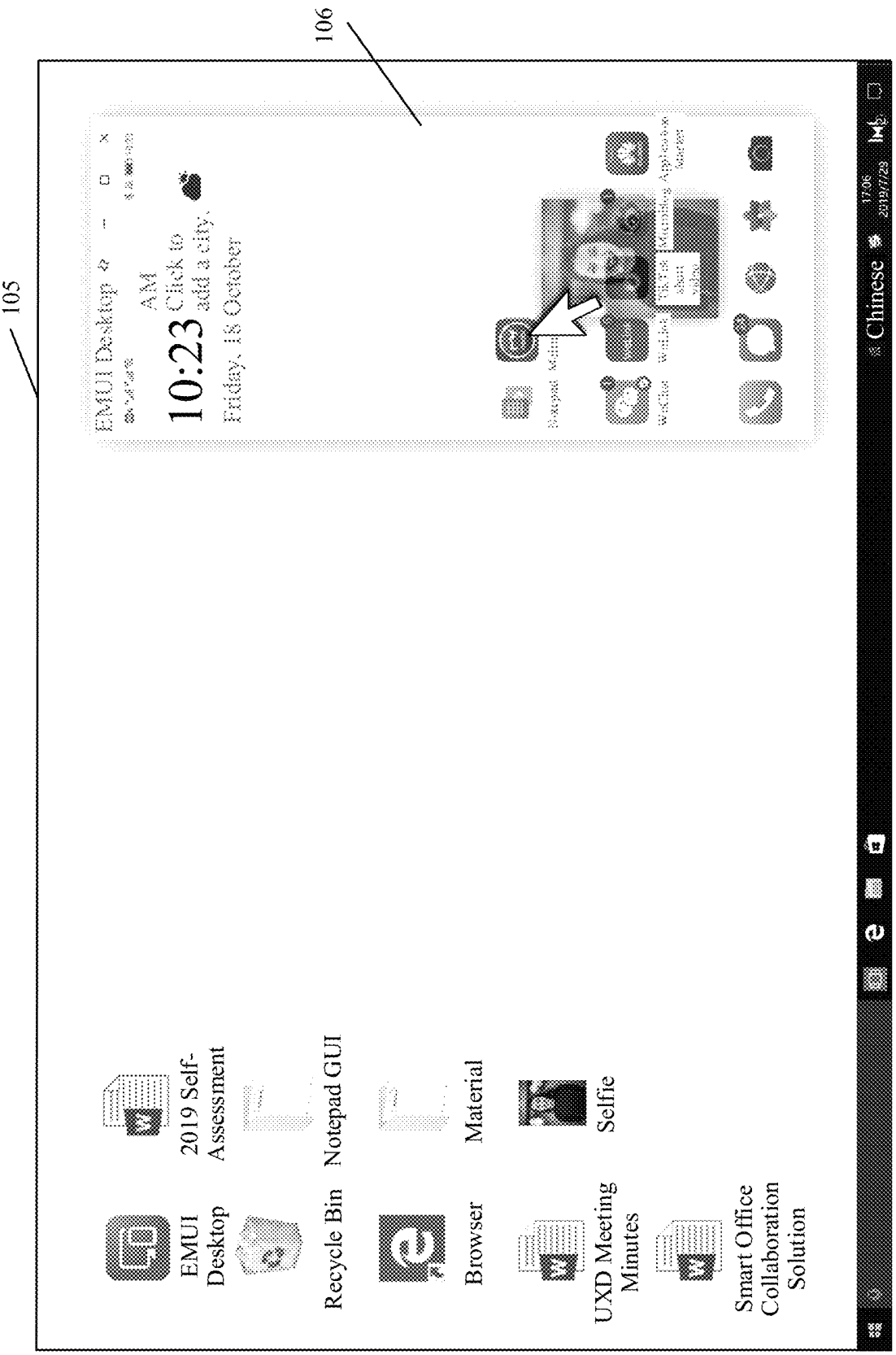
FIG. 10 is a schematic diagram of dragging a target file to a first application icon.
Figure 11:
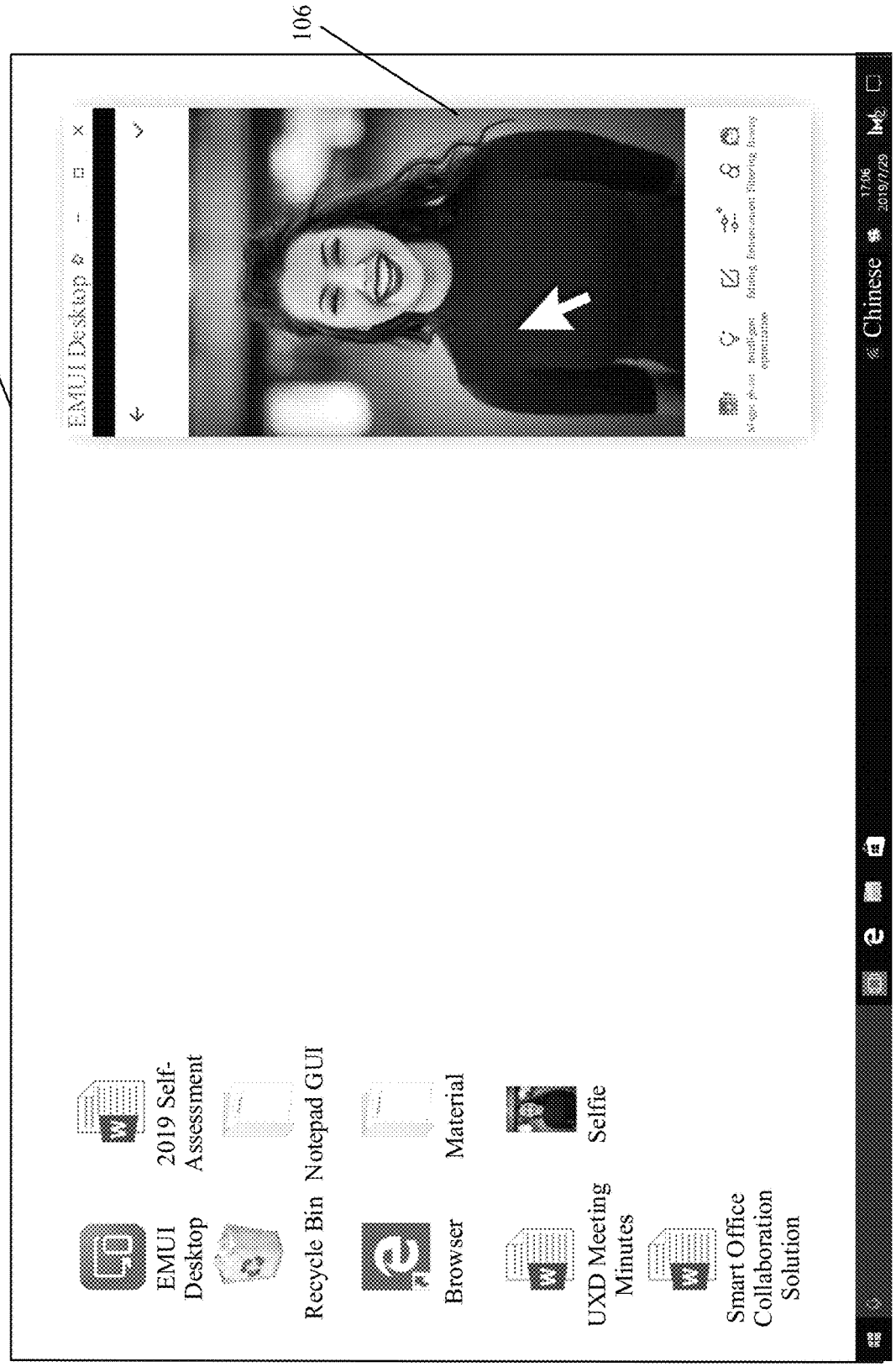
FIG. 11 is a schematic diagram of opening a target file by a first application.

For example, the first application includes "Meitu". FIG. 10 is a schematic diagram of dragging a target file to a first application icon, and FIG. 11 is a schematic diagram of opening a target file by a first application. As shown in FIG. 10 and FIG. 11, the target file is a file in a picture format named "selfie", and the first application is "Meitu". When it is detected that the "selfie" file is dragged by the first operation to an icon of "Meitu", and the first operation is released, because "Meitu" supports the file in a picture format, the "selfie" file is opened by "Meitu". In this case, when it is detected that a target file in an audio format is dragged by the first operation to the icon of "Meitu", and the first operation is released, because "Meitu" does not support the file in an audio format, the target file in an audio format cannot be opened by "Meitu", and the user is prompted that "Meitu" does not support opening of the target file in an audio format. A target application supporting the audio format is recommended to the user, for example, "QQ music". The user is asked whether to use "QQ music" to open the target file in an audio format.

Optionally, the first application includes a social application. Specifically, when the first application includes the social application, the step 210 specifically includes:

Step 2102: Use the first application to open the target file in the collaboration window, and prompt the user whether to present a status based on the opened target file.

For example, the first application includes "Microblog". When it is detected that the "selfie" file is dragged by the first operation to an icon of "Microblog", and the first operation is released, because "Microblog" supports a file in a picture format, the "selfie" file is opened by "Microblog". The user is prompted whether to present a status of the "selfie" file.

For example, the first application includes "Facebook". When it is detected that a target file of a document type is dragged by the first operation to an icon of "Facebook", and the first operation is released, because "Facebook" supports the target file of a document type, the target file is opened by "Facebook". The user is prompted whether to present a status of the target file.

For example, the first application includes "WeChat". When it is detected that a link type of target file is dragged by the first operation to an icon of "WeChat", and the first operation is released, because "WeChat" supports the link type of target file, the target file is opened by "WeChat", and the user is prompted whether to post the target file in Moments.

S212: Detect that the target file in the first electronic device is dragged by a second operation to the icon of the second application in the collaboration window, and the second operation is released.

In this embodiment, the second operation includes an operation of using the cursor to drag the target file by the user.

Step 214: Determine whether the second application supports opening of the target file, and if the second application does not support opening of the target file, perform step 216, or if the second application supports opening of the target file, perform step 218.

In this embodiment, before the second application is used to open the target file, whether the second application supports opening of the target file needs to be determined, that is, whether an extension name of a file supported by the second application includes an extension name of the target file is determined. If the extension name of the file supported by the second application does not include the extension name of the target file, it indicates that the target file cannot be opened by the second application; or if the extension name of the file supported by the second application includes the extension name of the target file, it indicates that the target file can be opened by the second application.

Step 216: Prompt the user that the second application does not support opening of the target file, recommend, to the user, a target application based on the type of the target file, and ask, based on the target application, the user whether to use the target application to open the target file.

Step 218: Use the second application to open the target file in the collaboration window.

In the related technology, in the collaboration mode, if the second application is used to open the target file in the collaboration window, the second application needs to be opened first.

In this embodiment, in the collaboration mode, the second application does not need to be started first, and the second application may be used to open the target file in the collaboration window provided that the target file is dragged to the icon of the second application. Compared with the related technology, the technical solution provided in this embodiment can implement that the first electronic device 100 quickly uses the target application of the second electronic device 200 to process the target file in the first electronic device 100. This improves processing efficiency of the first electronic device 100.

Optionally, the second application includes a picture editing application.

Optionally, the second application includes a social application. Specifically, when the second application includes the social application, the step 218 specifically includes:

Step 2182: Use the second application to open the target file in the collaboration window, and prompt the user whether to present a status based on the opened target file.

In this embodiment, the steps 204 to 210 and the steps 212 to 218 are not subject to a specific sequence. The steps 204 to 210 may be performed before the steps 212 to 218, or the steps 212 to 218 may be performed before the steps 204 to 210.

In the technical solution of the file processing method provided in this embodiment, the second electronic device projects onto the first electronic device, and generates the collaboration window on the first electronic device, where the collaboration window includes the desktop of the second electronic device. It is detected that the target file in the first electronic device is dragged by the first operation to the icon of the first application in the collaboration window, and the first operation is released; and the first application is used to open the target file in the collaboration window. It is detected that the target file in the first electronic device is dragged by the second operation to the icon of the second application in the collaboration window, and the second operation is released; and the second application is used to open the target file in the collaboration window. This can implement that after the target file is dragged to an icon of one target application in the collaboration window across systems, the target application automatically opens the target file.

In this embodiment, the first electronic device 100 includes a mobile phone, a tablet computer, a wearable device, or a personal computer. The second electronic device 200 includes a mobile phone, a tablet computer, a wearable device, or a personal computer.

Preferably, the first electronic device 100 is a computer, and the second electronic device 200 is a mobile phone.

Optionally, the technical solution provided in this embodiment is applicable to all touchscreen-type electronic devices.

When the technical solution provided in this embodiment is applied to an electronic device including a mouse, for example, a user performs a dragging operation on the target file by clicking a left mouse button, and when a hand of the user leaves the left mouse button, the dragging operation ends. When the technical solution provided in this embodiment is applied to a touchscreen-type electronic device, for example, a user presses a touchscreen by using a finger to perform a dragging operation on the target file, and when the finger of the user leaves the touchscreen, the dragging operation ends.

In the technical solution of the file processing method provided in this embodiment, the second electronic device projects onto the first electronic device, and generates the collaboration window on the first electronic device, where the collaboration window includes the desktop of the second electronic device. It is detected that the target file in the first electronic device is dragged by the first operation to the icon of the first application in the collaboration window, and the first operation is released; and the first application is used to open the target file in the collaboration window. It is detected that the target file in the first electronic device is dragged by the second operation to the icon of the second application in the collaboration window, and the second operation is released; and the second application is used to open the target file in the collaboration window. This can implement that after the target file is dragged to an icon of one target application in the collaboration window across systems, the target application automatically opens the target file.

The file processing methods provided in embodiments of this application are described in detail above with reference to FIG. 1 to FIG. 11. The following describes apparatus embodiments of this application in detail with reference to FIG. 12 to FIG. 13. It should be understood that the electronic device in embodiments of this application may perform the foregoing methods in embodiments of this application. In other words, for specific working processes of the following products, refer to a corresponding process in the foregoing method embodiments.

Figure 12:
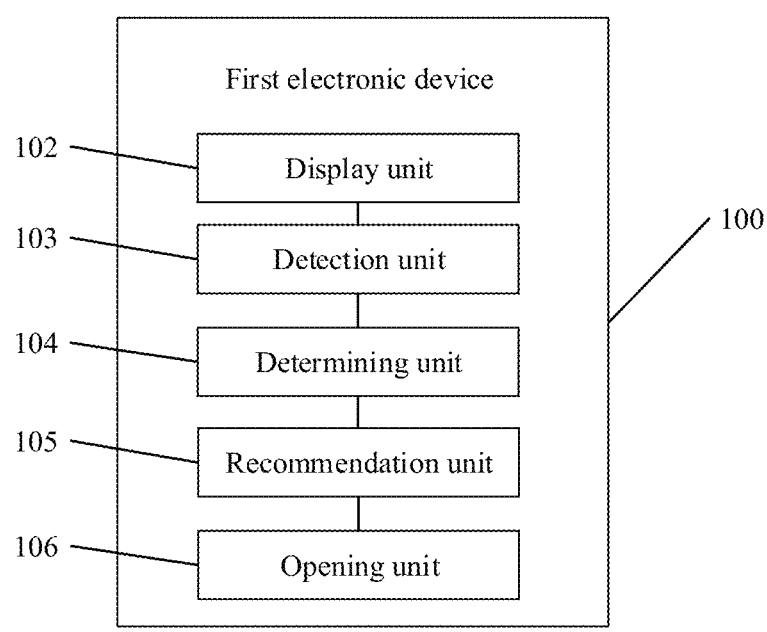
FIG. 12 is a schematic diagram of a structure of a first electronic device according to an embodiment of this application.

FIG. 12 is a schematic diagram of a structure of the first electronic device 100 according to an embodiment of this application. It should be understood that the first electronic device 100 can perform steps in the methods in FIG. 2 to FIG. 3A and FIG. 3B. To avoid repetition, details are not described herein again. The first electronic device 100 and the second electronic device 200 establish a wireless connection. The first electronic device 100 includes a display unit 102, a detection unit 103, and an opening unit 106.

The display unit 102 is configured to display, on a screen of a display of the first electronic device, a collaboration window generated when the second electronic device projects onto the first electronic device, where the collaboration window includes a desktop of the second electronic device, the desktop of the second electronic device includes at least an icon of a first application and an icon of a second application, and the first application is different from the second application. The detection unit 103 is configured to detect that a target file in the first electronic device is dragged by a first operation to the icon of the first application in the collaboration window, and the first operation is released. The detection unit 103 is further configured to detect that the target file in the first electronic device is dragged by a second operation to the icon of the second application in the collaboration window, and the second operation is released. The opening unit 106 is configured to use the first application to open the target file in the collaboration window. The opening unit 106 is further configured to use the second application to open the target file in the collaboration window.

Optionally, the first electronic device 100 and the second electronic device 200 establish the wireless connection by using a Huawei Share OneHop technology.

Optionally, content of the collaboration window correspondingly changes with an operation performed by a user on the second electronic device.

The first electronic device 100 further includes a determining unit 104 and a recommendation unit 105.

The determining unit 104 is configured to determine whether the first application supports opening of the target file. The determining unit 104 is further configured to determine whether the second application supports opening of the target file. The recommendation unit 105 is configured to: if the determining unit 104 determines that the first application does not support opening of the target file, prompt the user that the first application does not support opening of the target file, recommend, to the user, a target application based on a type of the target file, and ask, based on the target application, the user whether to use the target application to open the target file. The recommendation unit 105 is further configured to: if the determining unit 104 determines that the second application does not support opening of the target file, prompt the user that the second application does not support opening of the target file, recommend, to the user, a target application based on the type of the target file, and ask, based on the target application, the user whether to use the target application to open the target file.

The opening unit 106 is configured to: if the determining unit 104 determines that the first application supports opening of the target file, use the first application to open the target file in the collaboration window. The opening unit 106 is further configured to: if the determining unit 104 determines that the second application supports opening of the target file, use the second application to open the target file in the collaboration window.

Optionally, the first application includes a picture editing application.

Optionally, the second application includes a picture editing application.

Optionally, the first application includes a social application. Specifically, when the first application includes the social application, the opening unit 106 is specifically configured to: if the determining unit 104 determines that the first application supports opening of the target file, use the first application to open the target file in the collaboration window, and prompt the user whether to present a status based on the opened target file.

Optionally, the second application includes a social application. Specifically, when the second application includes the social application, the opening unit 106 is further specifically configured to: if the determining unit 104 determines that the second application supports opening of the target file, use the second application to open the target file in the collaboration window, and prompt the user whether to present a status based on the opened target file.

Optionally, the first electronic device 100 includes a mobile phone, a tablet computer, a wearable device, or a personal computer. The second electronic device 200 includes a mobile phone, a tablet computer, a wearable device, or a personal computer.

It should be understood that the first electronic device 100 herein is represented in a form of a functional unit. The term "unit" herein may be implemented in a form of software and/or hardware. This is not specifically limited. For example, the "unit" may be a software program, a hardware circuit, or a combination thereof for implementing the foregoing functions. The hardware circuit may include an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described functions.

Therefore, the units in the examples described in embodiments of this application can be implemented by using electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

An embodiment of this application provides an electronic device. The electronic device may be a terminal device, or may alternatively be a circuit device built into the terminal device. The device includes the first electronic device or the second electronic device, and may be configured to perform the functions/steps in the foregoing method embodiments.

Figure 13:
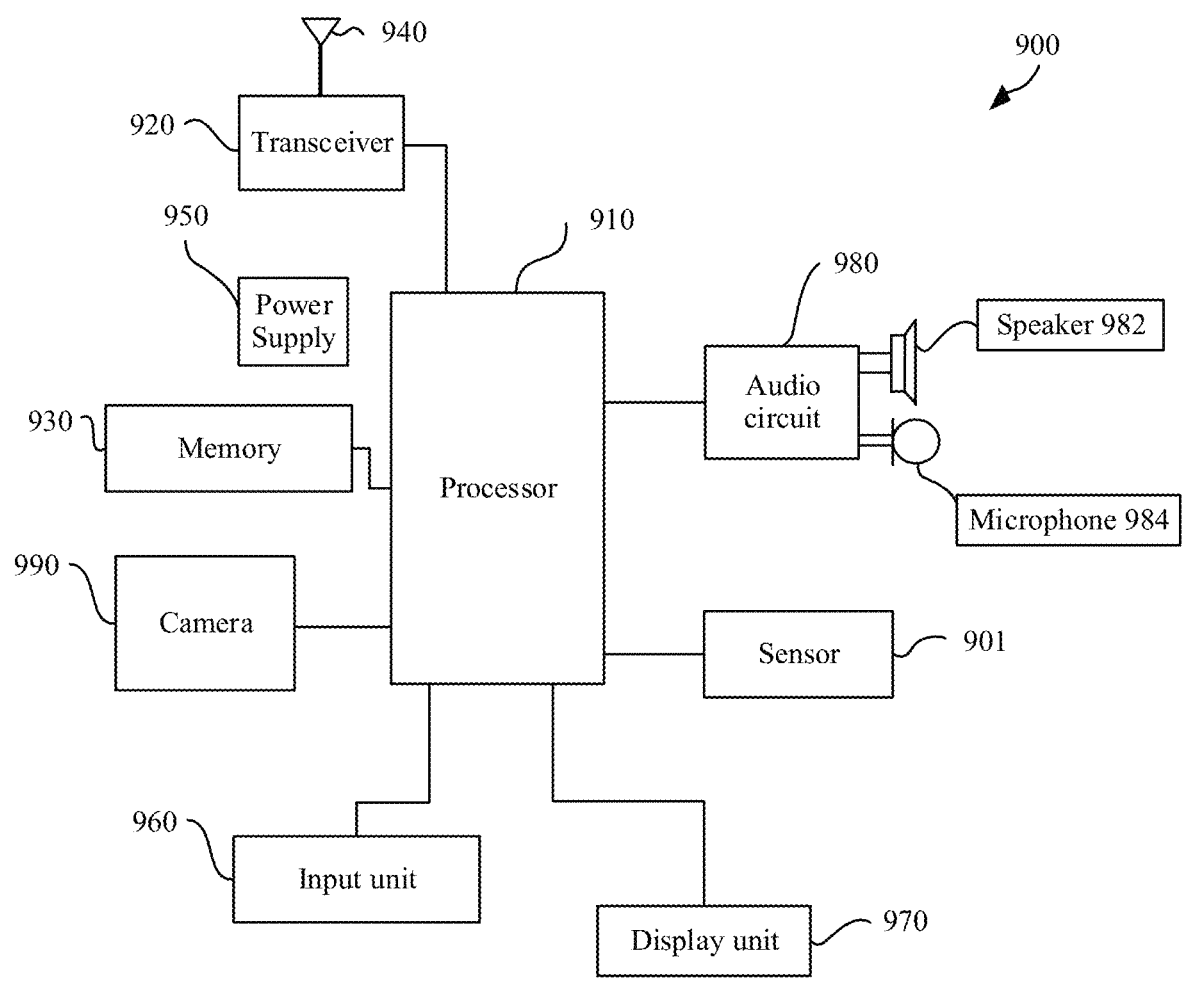
FIG. 13 is a schematic diagram of a structure of an electronic device according to an embodiment of this application.

As shown in FIG. 13, an electronic device 900 may include a processor 910 and a transceiver 920. Optionally, the electronic device 900 may further include a memory 930. The processor 910, the transceiver 920, and the memory 930 may communicate with each other through an internal connection path to transfer a control signal and/or a data signal. The memory 930 is configured to store a computer program. The processor 910 is configured to invoke and run the computer program in the memory 930.

Optionally, the electronic device 900 may further include an antenna 940, configured to send a wireless signal output by the transceiver 920.

The processor 910 and the memory 930 may be integrated into one processing apparatus, or more commonly be components independent of each other. The processor 910 is configured to execute program code stored in the memory 930 to implement the foregoing functions. In a specific implementation, the memory 930 may also be integrated into the processor 910, or may be independent of the processor 910.

In addition, the electronic device 900 may further include one or more of an input unit 960, a display unit 970, an audio circuit 980, a camera 990, a sensor 901, and the like, to improve the functions of the electronic device 900. The audio circuit may further include a speaker 982, a microphone 984, and the like. The display unit 970 may include a display screen.

Optionally, the electronic device 900 may further include a power supply 950, configured to supply power to various components or circuits in the terminal device.

It should be understood that the electronic device 900 shown in FIG. 13 can implement processes in the method embodiments shown in FIG. 2 to FIG. 3A and FIG. 3B. Operations and/or functions of the modules of the electronic device 900 separately implement a corresponding process in the foregoing method embodiments. For details, refer to the descriptions in the foregoing method embodiments. To avoid repetition, detailed descriptions are appropriately omitted herein.

It should be understood that the processor 910 in the electronic device 900 shown in FIG. 13 may be a system on a chip (SoC). The processor 910 may include a central processing unit (CPU), or may further include another type of processor. The CPU may be referred to as a primary CPU. The processors work together to implement the foregoing method procedures, and each processor may selectively execute a part of software drivers.

In conclusion, the processors or processing units in the processor 910 may cooperate to implement the foregoing method procedures, and software programs corresponding to the processors or processing units may be stored in the memory 930.

An embodiment of this application provides a computer-readable storage medium. The computer-readable storage medium stores instructions. When the instructions are run on a terminal device, the terminal device is enabled to perform the steps in the file processing methods shown in FIG. 2 to FIG. 3A and FIG. 3B.

An embodiment of this application further provides a computer program product including instructions. When the computer program product is run on a computer or at least one processor, the computer is enabled to perform the steps in the file processing methods shown in FIG. 2 to FIG. 3A and FIG. 3B.

An embodiment of this application further provides a chip, including a processor. The processor is configured to read and run a computer program stored in a memory, to perform a corresponding operation and/or procedure in the file processing method provided in this application.

Optionally, the chip further includes the memory. The memory is connected to the processor through a circuit or a wire, and the processor is configured to read and execute the computer program in the memory. Optionally, the chip further includes a communications interface, and the processor is connected to the communications interface. The communications interface is configured to receive data and/or information that need/needs to be processed. The processor obtains the data and/or information from the communications interface, and processes the data and/or information. The communications interface may be an input/output interface.

In the foregoing embodiments, the processor 910 may include, for example, a central processing unit (CPU), a microprocessor, a microcontroller, or a digital signal processor, and may further include a GPU, an NPU, and an ISP. The processor may further include a necessary hardware accelerator or a logic processing hardware circuit, for example, an application-specific integrated circuit (ASIC), or one or more integrated circuits configured to control programs to perform the technical solutions in this application. In addition, the processor may have a function of operating one or more software programs, and the software program may be stored in the memory.

The memory may be a read-only memory (ROM), another type of static storage device that can store static information and instructions, or a random access memory (RAM) or another type of dynamic storage device that may store information and instructions, or may be an electrically erasable programmable read-only memory (EEPROM), a compact disc read-only memory (CD-ROM) or another compact disc storage medium, an optical disc storage medium (including a compact optical disc, a laser disc, an optical disc, a digital versatile optical disc, a Blu-ray disc, and the like), a magnetic disk storage medium or another magnetic storage device, any other medium that may be used to carry or store expected program code in a form of instructions or a data structure and that can be accessed by a computer, or the like.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that units and algorithm steps described in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In embodiments of this application, when any of the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing an electronic device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A file processing method, applied to a first electronic device, wherein the first electronic device and a second electronic device establish a wireless connection, and an operating system run on the first electronic device is different from an operating system run on the second electronic device, and the method comprises:

displaying, on a screen of a display of the first electronic device, a collaboration window generated by the second electronic device, upon the second electronic device projecting onto the first electronic device, wherein the collaboration window comprises a desktop of the second electronic device, the desktop of the second electronic device comprises at least an icon of a first application and an icon of a second application, both the first application and the second application are run by the second electronic device, and the first application is different from the second application;

detecting that a target file in the first electronic device which is outside of the collaboration window is dragged by a first operation to the icon of the first application in the collaboration window, and the first operation is released, and wherein the first application is run to open the target file in the collaboration window;

detecting that the target file in the first electronic device which is outside of the collaboration window is further dragged by a second operation to the icon of the second application in the collaboration window, and the second operation is released, and wherein the second application is run to open the target file in the collaboration window;

wherein before the first application being run by the second electronic device to open the target file of the first electronic device in the collaboration window, it is determined that whether the first application supports opening of the target file, by determining whether an extension name of a file supported by the first application includes an extension name of the target file;

wherein before the second application being run by the second electronic device to open the target file of the first electronic device in the collaboration window, it is determined that whether the second application supports opening of the target file, by determining whether an extension name of a file supported by the second application includes an extension name of the target file; and wherein that the first electronic device and the second electronic device establish the wireless connection comprises:

establishing, by the first electronic device, the wireless connection to the second electronic device by using a wireless connection technology, wherein an automatic paring is implemented after near field communication (NFC) sensor areas of the first electronic device and the second electronic device are in contact, and wherein after the automatic pairing, a wireless projection connection and a wireless local area network (WLAN) transmission are automatically established between the first electronic device and the second electronic device.

2. The method according to claim 1, wherein content of the collaboration window correspondingly changes with an operation performed by a user on the second electronic device.

3. The method according to claim 1, further comprising: when it is determined that the first application does not support opening of the target file, prompting a user that the first application does not support opening of the target file, recommending, to the user, a target application based on a type of the target file, and asking, based on the target application, the user whether to use the target application to open the target file; or when it is determined that the first application supports opening of the target file, continuously using the first application to open the target file in the collaboration window.

4. The method according to claim 1, further comprising: when it is determined that the second application does not support opening of the target file, prompting a user that the second application does not support opening of the target file, recommending, to the user, a target application based on a type of the target file, and asking, based on the target application, the user whether to use the target application to open the target file; or when it is determined that the second application supports opening of the target file, continuously using the second application to open the target file in the collaboration window.

5. The method according to claim 1, wherein the first application comprises a picture editing application.

6. The method according to claim 1, wherein the second application comprises a picture editing application.

7. The method according to claim 1, wherein the first application comprises a social application; and the using the first application to open the target file in the collaboration window comprises:

using the first application to open the target file in the collaboration window, and prompting a user whether to present a status based on the opened target file.

8. The method according to claim 1, wherein the second application comprises a social application; and the using the second application to open the target file in the collaboration window comprises:

using the second application to open the target file in the collaboration window, and prompting a user whether to present a status based on the opened target file.

9. A first electronic device, wherein the first electronic device and a second electronic device establish a wireless connection, and an operating system run on the first electronic device is different from an operating system run on the second electronic device; the first electronic device comprises a display, a processor, and a memory; the memory is configured to store a computer program; the computer program comprises program instructions; and the program instructions, upon execution by the first electronic device, cause the first electronic device to perform the following:

displaying, on a screen of the display of the first electronic device, a collaboration window generated by the second electronic device, upon the second electronic device projecting onto the first electronic device, wherein the collaboration window comprises a desktop of the second electronic device, the desktop of the second electronic device comprises at least an icon of a first application and an icon of a second application, both the first application and the second application are run by the second electronic device, and the first application is different from the second application;

wherein upon detecting that a target file in the first electronic device which is outside of the collaboration window is dragged by a first operation to the icon of the first application in the collaboration window, and the first operation is released, the first application is run to open the target file in the collaboration window;

wherein upon detecting that the target file in the first electronic device which is outside of the collaboration window is further dragged by a second operation to the icon of the second application in the collaboration window, and the second operation is released, the second application is run to open the target file in the collaboration window;

wherein before the first application being run by the second electronic device to open the target file of the first electronic device in the collaboration window, it is determined that whether the first application supports opening of the target file, by determining whether an extension name of a file supported by the first application includes an extension name of the target file;

wherein before the second application being run by the second electronic device to open the target file of the first electronic device in the collaboration window, it is determined that whether the second application supports opening of the target file, by determining whether an extension name of a file supported by the second first application includes an extension name of the target file; and wherein that the first electronic device and the second electronic device establish the wireless connection comprises:

establishing, by the first electronic device, the wireless connection to the second electronic device by using a wireless connection technology, wherein an automatic paring is implemented after near field communication (NFC) sensor areas of the first electronic device and the second electronic device are in contact, and wherein after the automatic pairing, a wireless projection connection and a wireless local area network (WLAN)

transmission are automatically established between the first electronic device and the second electronic device.

10. The first electronic device according to claim 9, wherein content of the collaboration window correspondingly changes with an operation performed by a user on the second electronic device.

11. The first electronic device according to claim 9, wherein upon execution by the first electronic device, the instructions further cause the first electronic device to perform the following:
when it is determined that the first application does not support opening of the target file, prompting a user that the first application does not support opening of the target file, recommending, to the user, a target application based on a type of the target file, and asking, based on the target application, the user whether to use the target application to open the target file; or
when it is determined that the first application supports opening of the target file, continuously using the first application to open the target file in the collaboration window.

12. The first electronic device according to claim 9, wherein upon execution by the first electronic device, the instructions further cause the first electronic device to perform the following:
when it is determined that the second application does not support opening of the target file, prompting a user that the second application does not support opening of the target file, recommending, to the user, a target application based on a type of the target file, and asking, based on the target application, the user whether to use the target application to open the target file; or
when it is determined that the second application supports opening of the target file, continuously using the second application to open the target file in the collaboration window.

13. The first electronic device according to claim 9, wherein the first application comprises a picture editing application.

14. The first electronic device according to claim 9, wherein the second application comprises a picture editing application.

15. The first electronic device according to claim 9, wherein the first application comprises a social application; and
when the processor runs the program instructions, the first electronic device is enabled to perform the following:
using the first application to open the target file in the collaboration window, and prompting a user whether to present a status based on the opened target file.

16. The first electronic device according to claim 9, wherein the second application comprises a social application; and
when the instructions are executed by the first electronic device, the first electronic device is enabled to perform the following:
using the second application to open the target file in the collaboration window, and prompting a user whether to present a status based on the opened target file.

17. A file processing system, comprising a second electronic device and the first electronic device according to claim 9, wherein the first electronic device and the second electronic device establish a wireless connection.

18. A non-transitory computer-readable storage medium, wherein the computer-readable storage medium stores a computer program, the computer program comprises program instructions, and when the program requests are run by a computer, the computer is enabled to perform:
displaying, on a screen of a display of a first electronic device, a collaboration window generated by a second electronic device, upon the second electronic device projecting onto the first electronic device, wherein the first electronic device and the second electronic device establish a wireless connection, and an operating system run on the first electronic device is different from an operating system run on the second electronic device, the collaboration window comprises a desktop of the second electronic device, the desktop of the second electronic device comprises at least an icon of a first application and an icon of a second application, both the first application and the second application are run by the second electronic device, and the first application is different from the second application;
detecting that a target file in the first electronic device which is outside of the collaboration window is dragged by a first operation to the icon of the first application in the collaboration window, and the first operation is released, and wherein the first application is run to open the target file in the collaboration window;
detecting that the target file in the first electronic device which is outside of the collaboration window is further dragged by a second operation to the icon of the second application in the collaboration window, and the second operation is released, and wherein the second application is run to open the target file in the collaboration window;
wherein before the first application being run by the second electronic device to open the target file of the first electronic device in the collaboration window, it is determined that whether the first application supports opening of the target file, by determining whether an extension name of a file supported by the first application includes an extension name of the target file;
wherein before the second application being run by the second electronic device to open the target file of the first electronic device in the collaboration window, it is determined that whether the second application supports opening of the target file, by determining whether an extension name of a file supported by the second application includes an extension name of the target file; and
wherein that the first electronic device and the second electronic device establish the wireless connection comprises:
establishing, by the first electronic device, the wireless connection to the second electronic device by using a wireless connection technology, wherein an automatic paring is implemented after near field communication (NFC) sensor areas of the first electronic device and the second electronic device are in contact, and wherein after the automatic pairing, a wireless projection connection and a wireless local area network (WLAN) transmission are automatically established between the first electronic device and the second electronic device.

19. The non-transitory computer-readable storage medium according to claim 18, wherein content of the collaboration window correspondingly changes with an operation performed by a user on the second electronic device.

* * * * *

UNITED STATES PATENT AND TRADEMARK OFFICE
CERTIFICATE OF CORRECTION

Page 1 of 1

PATENT NO. : 12,124,692 B2
APPLICATION NO. : 17/848119
DATED : October 22, 2024
INVENTOR(S) : Siyue Niu It is certified that error appears in the above-identified patent and that said Letters Patent is hereby corrected as shown below:

In the Claims

Claim 9: Column 18, Line 54: "an extension name of a file supported by the second first" should read as -- an extension name of a file supported by the second --.

Signed and Sealed this
Twenty-seventh Day of May, 2025

Coke Morgan Stewart
*Acting Director of the United States Patent and Trademark Office*